Mar. 27, 1923.
1,449,919
J. SLEPIAN
NONINDUCTIVE INTERFERENCE SYSTEM
Filed Mar. 8, 1919
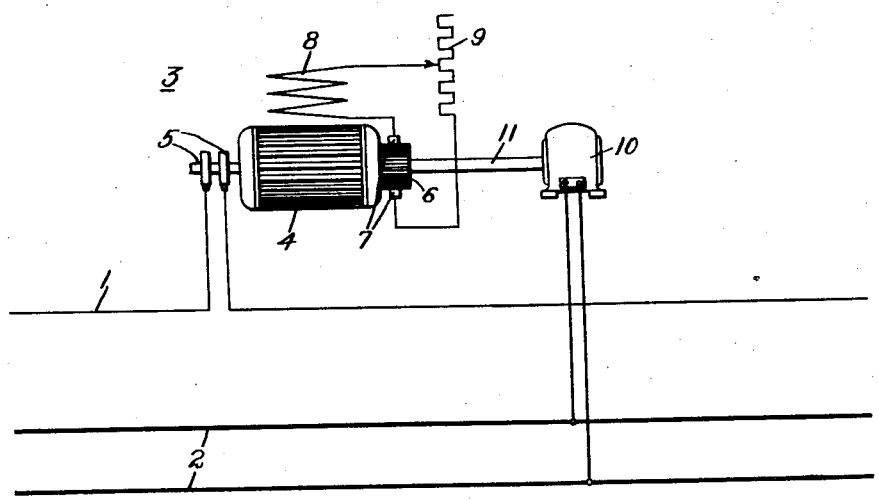
WITNESSES:
J. A. Helsel
a. a. Brand
INVENTOR
Joseph Slepian.
BY
Wesley G. Carr
ATTORNEY Patented Mar. 27, 1923.

1,449,919

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

NONINDUCTIVE INTERFERENCE SYSTEM.

Application filed March 8, 1919. Serial No. 281,434.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Noninductive Interference Systems, of which the following is a specification.

My invention relates to means for preventing inductive interference in intelligence-transmission systems, and it has for its object to provide means of the character designated in which the tendency for a foreign or induced electromotive force to exist in the intelligence-transmission circuit is effectually overcome by the automatic superposition thereupon of an equal and opposite electromotive force to that which tends to exist therein.

The single figure of the accompanying drawing illustrates diagrammatically one embodiment of my invention, in which my inductive-interference-preventing means is employed.

In practising my invention, I make use of the principle that a shunt-excited rotary converter, when connected in series, through the slip rings thereof, with an electrical circuit, and when excited from the commutator side thereof, will develop an alternating-current voltage which automatically takes the proper phase position to oppose an electromotive force which is impressed upon the electric circuit with which it is series connected. Moreover, such an alternating-current voltage will, after an initial adjustment of the strength of the field current, automatically attain such value as to reduce the total alternating-current voltage which is impressed upon the electrical circuit to substantially zero.

Referring now to the drawing, an intelligence-transmission circuit 1 is shown as adjacent to a system of alternating-current distribution 2—2.

It is apparent that any abnormal surge or short-circuit condition in the system of distribution will have an inductive effect upon the adjacent intelligence-transmission circuit and will induce therein a voltage of substantially the frequency of the current flowing in the system of distribution. As is well known, such disturbance is extremely undesirable. While many systems have heretofore been proposed for the elimination thereof, I believe that the use of a dynamo-electric machine, as will hereinafter be described, is entirely novel in the art.

A dynamo-electric machine 3 of the rotary-converter type, having an armature member 4 provided with slip rings 5—5, a commutator member 6 and brushes 7—7, is shown as having the slip rings connected in series relationship with the intelligence-transmission circuit 1. A field winding 8 is energized from the commutator side of the armature by reason of connection with the brushes 7—7, and, furthermore, has in circuit therewith an adjustable rheostatic member 9 whereby an initial adjustment of the field strength may be had.

Any suitable means for driving the rotary-converter 3 in substantial synchronism with the current flowing in the system of distribution may be employed, and, for purposes of convenience, I have here shown such means as comprising an induction motor 10, energized from the system of distribution 2 and being direct connected to the armature of the rotary-converter 3 by a shaft 11.

Having described the essential elements of an inductive-interference system embodying my invention, the operation thereof is as follows: Whenever an alternating-current voltage is induced in the intelligence-transmission circuit, by reason of an abnormal surge or short-circuit condition in the system of distribution 2, the rotary-converter 3 automatically locks into proper phase position for opposing such voltage. After an initial adjustment of the field resistance, the current flowing through the field winding, by reason of the brush connection, will be such as to cause the generation of an alternating-current voltage of such value as to reduce the normal voltage in the intelligence-transmission circuit to substantially zero.

While I have shown but one embodiment of my invention, it is apparent that many modifications therein may be made to those skilled in the art and I desire therefore, that only such limitations shall be placed thereupon as are imposed by the prior art or are specifically set forth in the appended claims.

I claim as my invention:

1. In combination with an intelligence-transmission circuit, continuously rotatable dynamo-electric means for positively superimposing thereupon an electromotive force equal and opposite to any disturbing voltage which may be induced therein.

2. In combination with an intelligence-transmission circuit, continuously rotatable dynamo-electric means connected in series relationship therewith for positively superimposing thereupon an electromotive force equal and opposite to any disturbing voltage which may be induced therein.

3. In combination with a system of distribution, an intelligence-transmission circuit adjacent thereto and subject to interference when abnormal conditions obtain in said system of distribution, a circuit in which an electromotive force may be generated connected in series relation with the intelligence-transmission circuit, and continuously rotatable dynamo-electric means whereby said electromotive force is generated in correct phase position with respect to the voltage induced in the intelligence-transmission circuit by reason of the abnormal conditions arising in the system of distribution.

4. In combination with a system of distribution, an intelligence-transmission circuit adjacent thereto and subject to interference when abnormal conditions obtain in said system of distribution, continuously rotatable dynamo-electric means connected in series relationship with the intelligence-transmission circuit, and driving means for driving said dynamo-electric means at substantially synchronous speed, said driving means being supplied with energy of the same frequency as that in the system of distribution.

5. In combination with a system of distribution, an intelligence-transmission circuit adjacent thereto and subject to interference when abnormal conditions obtain in said system of distribution, dynamo-electric means comprising an armature member and a direct-current-excited field winding, said armature member being connected in series relationship with the intelligence-transmission circuit, and means for driving said dynamo-electric means at substantially synchronous speed corresponding to the frequency obtaining in the system of distribution.

6. In combination with a system of distribution, an intelligence-transmission circuit adjacent thereto and subject to interference when abnormal conditions obtain in said system of distribution, dynamo-electric means comprising an armature member, and a field winding, means for energizing said field member by direct current in such manner that an electromotive force is set up in said armature which tends to neutralize any electromotive force which may be impressed thereupon, and driving means for said dynamo-electric means energized from the system of distribution.

7. In combination with a system of distribution, an intelligence-transmission circuit adjacent thereto and subject to interference when abnormal conditions obtain in said system of distribution, a circuit in which an electromotive force may be generated connected in series relation with the intelligence-transmission circuit, dynamo-electric means comprising an armature member provided with slip rings and a commutator member and brushes, the intelligence-transmission circuit being connected in series with the slip rings, and a field winding connected to said brushes whereby an electromotive force is set up in said armature which tends to neutralize any electromotive force which may be impressed thereupon, and driving means for said dynamo-electric means energized from the system of distribution.

8. In combination with a system of distribution, an intelligence-transmission circuit adjacent thereto and subject to interference when abnormal conditions obtain in said system of distribution, a circuit in which an electromotive force equal and opposite to that which may be impressed thereupon by the abnormal conditions in the system of distribution may be generated connected in series relation with the intelligence-transmission circuit, and continuously rotatable dynamo-electric means whereby said electromotive force is generated in correct phase position with respect to the voltage induced in the intelligence-transmission circuit by reason of the abnormal conditions arising in the system of distribution.

9. In combination with a system of distribution, an intelligence-transmission circuit adjacent thereto and subject to interference when abnormal conditions obtain in said system of distribution, a continuously rotatable dynamo-electric machine in series with the intelligence-transmission circuit, and means for causing an electromotive force equal and opposite to that which may be impressed thereupon to be set up therein.

10. The combination with an alternating-current circuit and an independent circuit having conductors placed in inductive relationship to each other, of a dynamo-electric machine arranged in series-circuit relationship to said independent circuit and continuously running at such speed as to impede the flow of currents having the same frequency as said alternating-current circuit.

11. The combination with an alternating-current circuit and an independent circuit having conductors placed in inductive relationship to each other, of means for minimizing the disturbances tending to be set up in said independent circuit by currents flowing in said alternating-current circuit; said means comprising a synchronous machine arranged in series-circuit relationship with said independent circuit and continuously running at substantially synchronous speed corresponding to the frequency obtaining in said alternating-current circuit.

12. The combination with an alternating-current circuit and independent circuit having conductors placed in inductive relationship to each other, of a dynamo-electric machine arranged in series-circuit relationship to said independent circuit and running at substantially synchronous speed corresponding to the frequency obtaining in said alternating-current circuit, means for deriving unidirectional electromotive forces proportional to the electromotive forces induced in said independent circuit by said alternating-current circuit, and means for exciting said dynamo-electric machine from said unidirectional electromotive forces.

13. The combination with an alternating-current circuit and an independent circuit having conductors placed in inductive relationship to each other, of means for minimizing the disturbances tending to be set up in said independent circuit by currents flowing in said alternating-current circuit; said means comprising a dynamo-electric machine having two members rotating with respect to each other at substantially synchronous speed corresponding to the frequency obtaining in said alternating-current circuit, one of said members carrying a direct-current winding, the other of said members carrying means for generating an alternating-current electro-motive force and means for generating a direct-current electromotive force, said alternating-current means being disposed in series-circuit relationship with said independent circuit, and said direct-current means being connected to said direct-current winding.

14. The combination with an alternating-current circuit, and an independent circuit including a conductor placed in inductive relationship to said alternating-current circuit, of a single-phase dynamo-electric machine arranged in series-circuit relationship to said conductor and continuously running at such speed as to impede the flow of currents having the same frequency as said alternating-current circuit.

15. The combination with an alternating-current circuit, and an independent circuit including a conductor placed in inductive relationship to said alternating-current circuit, of a single-phase synchronous machine arranged in series-circuit relationship with said conductor and continuously running at substantially synchronous speed corresponding to the frequency obtaining in said alternating-current circuit.

16. The combination with an alternating-current circuit, and an independent circuit including a conductor placed in inductive relationship to said alternating-current circuit, of a single-phase dynamo-electric machine arranged in series-circuit relationship to said conductor and running at substantially synchronous speed corresponding to the frequency obtaining in said alternating-current circuit, means for deriving unidirectional electromotive forces proportional to the electromotive forces induced in said independent circuit by said alternating-current circuit, and means for exciting said dynamo-electric machine from said unidirectional electromotive forces.

17. The combination with an alternating-current circuit, and an independent circuit including a conductor placed in inductive relationship to said alternating current circuit, of a single-phase dynamo-electric machine having two members rotating with respect to each other at substantially synchronous speed corresponding to the frequency obtaining in said alternating-current circuit, one of said members carrying a direct-current winding, the other of said members carrying means for generating a single-phase, alternating-current electromotive force and means for generating a direct-current electromotive force, said alternating-current means being disposed in series-circuit relationship with said independent circuit, and said direct-current means being connected to said direct-current winding.

In testimony whereof, I have hereunto subscribed my name this 25th day of Feb. 1919.

JOSEPH SLEPIAN.